April 25, 1933. F. H. PRESCOTT ET AL 1,905,054
IGNITION APPARATUS
Filed March 25, 1931 2 Sheets-Sheet 1
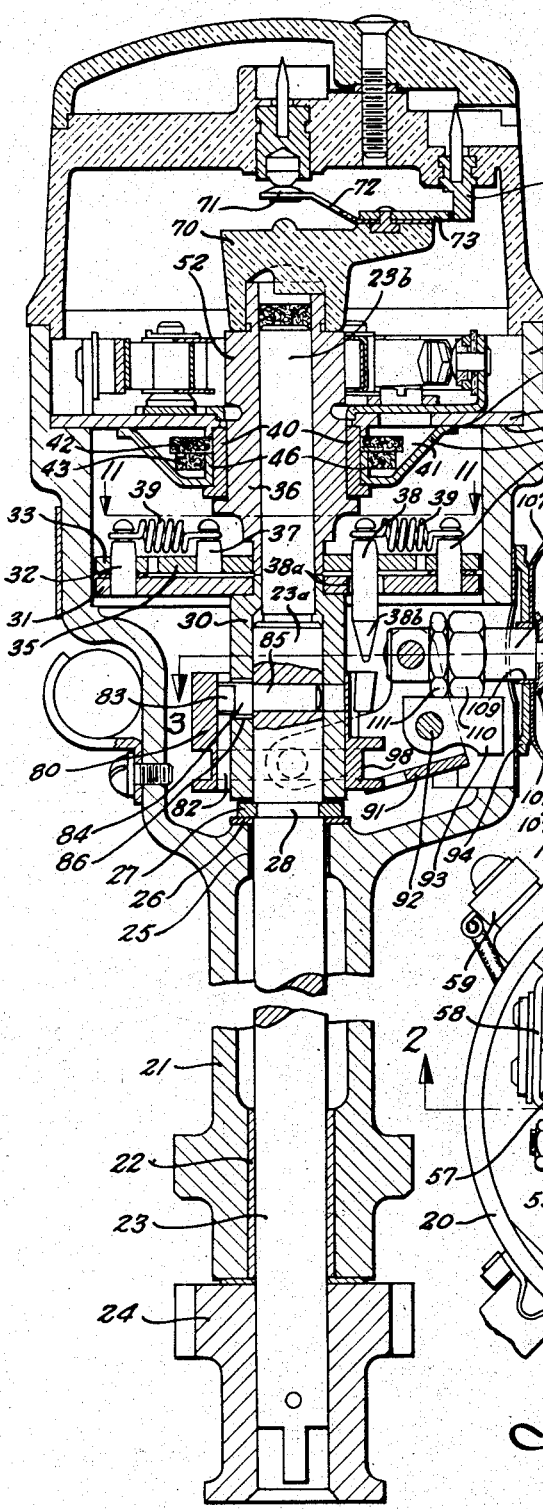
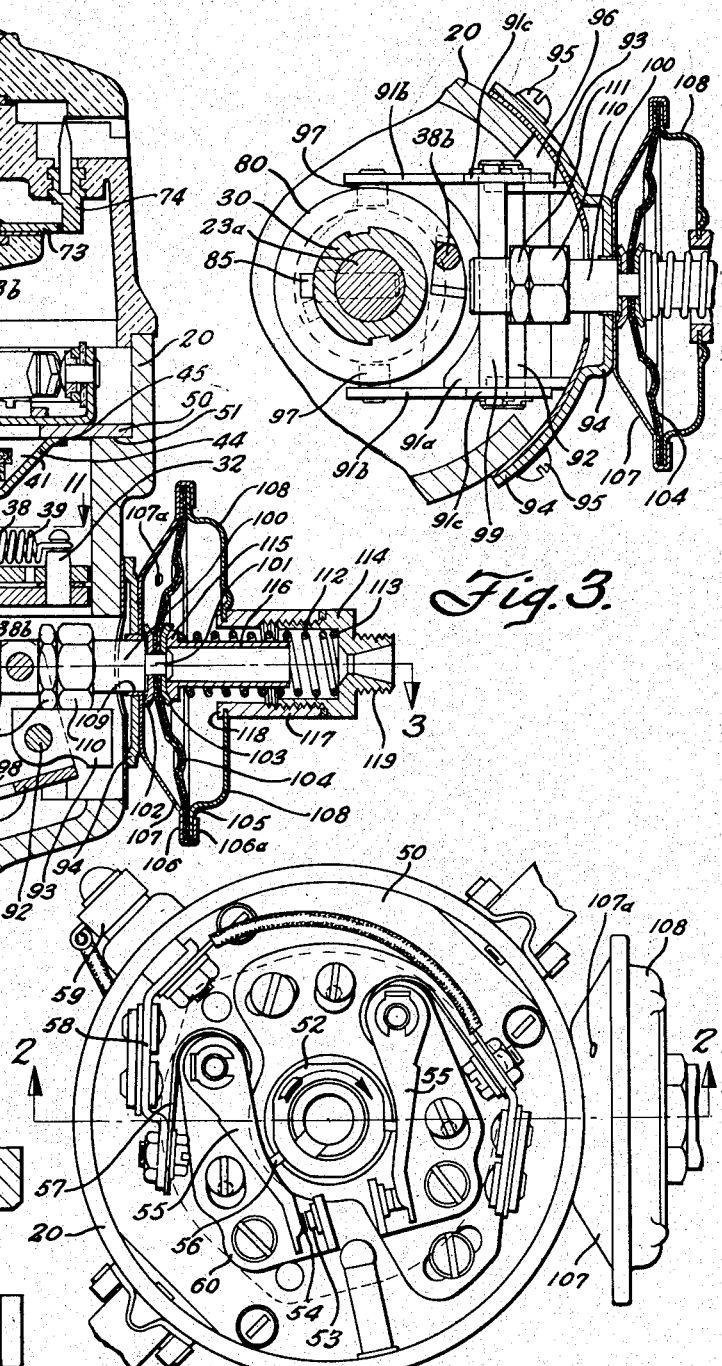
Fig. 1.
Fig. 2.
Fig. 3.
Inventors
FRANK H. PRESCOTT
JAMES L. ARTHUR
By Spencer Hardman & Fehr
their Attorneys

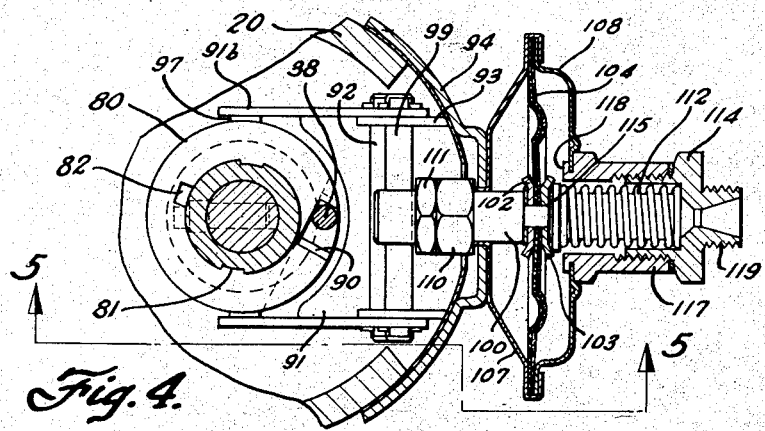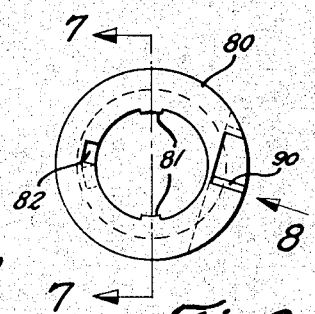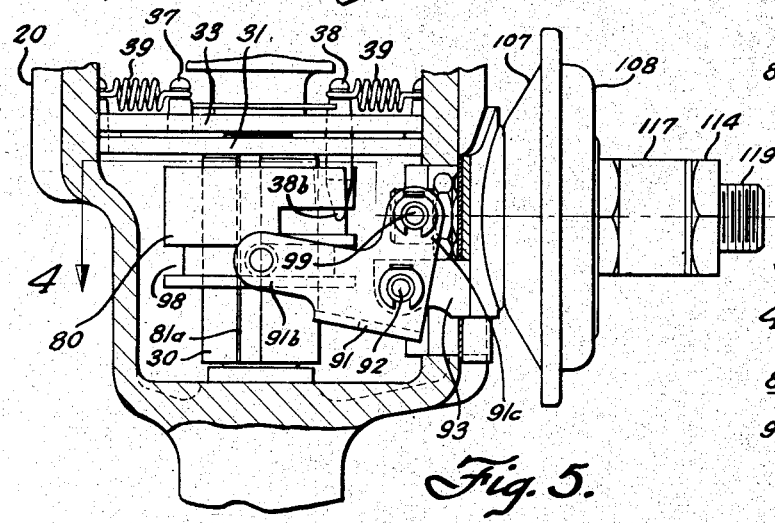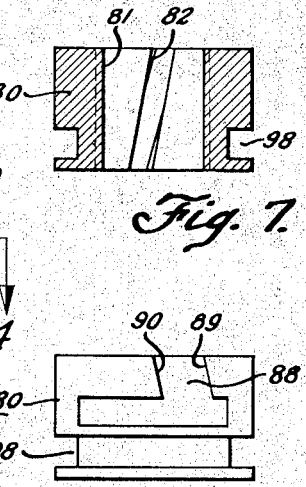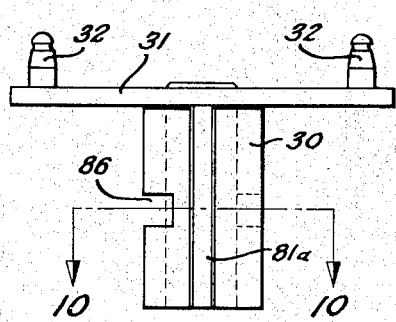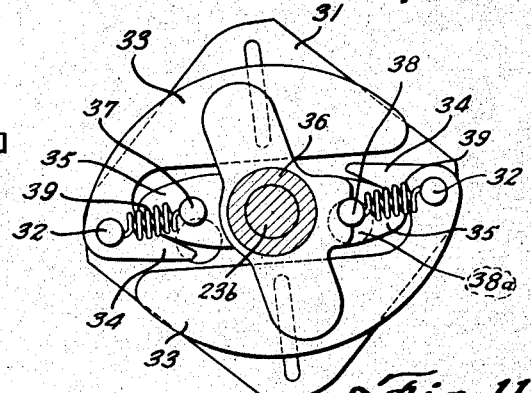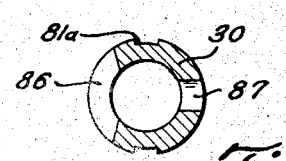

Patented Apr. 25, 1933

1,905,054

UNITED STATES PATENT OFFICE

FRANK H. PRESCOTT AND JAMES L. ARTHUR, OF ANDERSON, INDIANA, ASSIGNORS TO DELCO-REMY CORPORATION, OF ANDERSON, INDIANA, A CORPORATION OF DELAWARE

IGNITION APPARATUS

Application filed March 25, 1931. Serial No. 525,200.

This invention relates to apparatus for timing the ignition for an internal combustion engine and has among its objects the provision of improved means for automatically varying the timing of the ignition sparking impulse in response to engine load and engine speed conditions. In order to control the timing of the ignition in response to engine load conditions, the present invention follows the usual practice of controlling the timer in response to suction in the fuel intake pipe of the engine. The control of timing in response to engine speed is accomplished through the use of a centrifugal device for connecting the timer drive shaft with the timer cam and for varying the angular relation between them. One of the improvements which the present invention aims to provide is that of so coordinating the engine suction control with the engine speed control of the timer that the combined spark advance obtained in response to increase in engine speed and increase in suction in the fuel intake pipe will not exceed a certain amount. By limiting the total advance obtained by the combined effects of increasing speed and suction, the rate of advance with increasing speed and suction can be made relatively great with beneficial results with respect to economy of operating the engine.

Another object of the present invention is to provide an ignition timer controlled by speed responsive and suction responsive devices which cooperate with a train of coaxial shafts which theoretically should be in absolute alignment but which may be slightly out of alignment within reasonable limits due to an improved location of shaft bearings which the present invention provides.

Further objects and advantages of the present invention will be apparent from the following description, reference being had to the accompany drawings wherein a preferred embodiment of one form of the present invention is clearly shown.

In the drawings:

Fig. 1 is a plan view of the timer, the distributor and distributor rotor being removed.

Fig. 2 is a sectional view on line 2—2 of Fig. 1, and shows the distributor head and rotor in section.

Fig. 3 is a sectional view on the line 3—3 of Fig. 2.

Fig. 4 is a fragmentary sectional view similar to Fig. 3 showing the suction control mechanism moved into an advanced position, and is a sectional view taken on the line 4—4 of Fig. 5.

Fig. 5 is a sectional view on the line 5—5 of Fig. 4.

Fig. 6 is a plan view of a sleeve forming a part of the suction control mechanism.

Fig. 7 is a sectional view on line 7—7 of Fig. 6.

Fig. 8 is a side elevation of the sleeve shown in Fig. 6 viewed looking in the direction of arrow 8 in Fig. 6.

Fig. 9 is a side elevation of an assembly of weight plate and tubular hub.

Fig. 10 is a fragmentary sectional view on line 10—10 of Fig. 9.

Fig. 11 is a sectional view on the line 11—11 of Fig. 2.

In the drawings numeral 20 designates an ignition timer housing having a tubular shank 21 carrying at its lower end a bearing 22 for a timer drive shaft 23 driven by a gear 24 which meshes with a gear on the valve cam shaft of the engine. The shaft 23 passes loosely through an internal annular shoulder 25 and is supported by said shoulder which receives a washer 26 engaging a ring 27 swedged into an annular groove 28 thereby providing a shoulder for the shaft 23 which rests upon the annular shoulder 25 of the timer housing shank 21. The shaft 23 has an extension 23a for receiving a tubular intermediate shaft 30 which provides a tubular hub for a weight supporting plate 31 carrying weight pivot studs 32 pivotally supporting weights 33. Each weight has a lever arm 34 engageable with a lever arm 35 attached to a tubular shaft 36 having an easy running fit with the extension 23b of shaft 23. The lever arms 35 carry spring posts 37 and 38 respectively connected by springs 39 with the pivot studs 32. These springs resist outward movement of the weights 33 due to centrifugal force as speed increases, and hence return the weights to inner position adjacent the shaft 23 as the speed decreases. The shaft 36 is journalled in a bearing of porous material 40 such as porous bronze to which lubricant is fed from a lubricant reservoir 41 by felt washers 42 and 43. The reservoir 41 is provided by an annular cup shaped member 44 having an external circular flange 45 attached to the circuit breaker lever supporting plate 50 which rests upon a supporting ledge 51 provided by the timer housing 20. The member 44 has an internal annular flange 46 which fits snugly around the bearing 40.

The shaft 36 provides a cam 52 cooperating with one or more circuit interrupters for the purpose of controlling the ignition circuit. Each circuit interrupter comprises a pair of contacts 53 and 54 the latter being attached to a circuit breaker lever 55 carrying a rubbing block 56 which is urged toward the cam 52 by a leaf spring conductor 57 which conducts current from a terminal bracket 58 and a terminal 59 to the circuit breaker lever which is insulatingly supported by the bracket 60 attached to the bracket supporting plate 50.

The cam 52 supports and drives a distributor rotor 70 carrying a center button 71 mounted on the end of a leaf spring conductor 72 which is electrically connected with a conducting segment 73 which swings past a plurality of stationary distributor posts arranged in a circular row, only one of these posts being shown at 74 in Fig. 2.

The speed responsive device shown in Figs. 2 and 11 is constructed for an ignition timer whose cam rotates clockwise as viewed in Fig. 1. As the weights swing outwardly with increasing speed the levers 35 are turned clockwise, as viewed in Fig. 11, relative to the plate 31 thereby advancing the timing of the ignition spark. The amount of advance which can be obtained with increase of speed is limited due to the fact that the spring post 38 shown in Fig. 2 extends through a somewhat larger hole 38a in the weight plate 31. Hence, the swing of the lever 35 relative to the weight plate 31 is limited by the pin 38 striking the sides of the hole 38a. The pin 38 has a tapered point 38b for a purpose to be described.

The engine suction responsive means for controlling the timing of the ignition comprises a mechanism for turning the intermediate shaft 30 relative to the drive shaft 23. This mechanism includes a sleeve 80 movable along the shaft 30 and longitudinally splined thereto by means of integral keys 81 cooperating with slots 81a (see Fig. 9) in shaft 30. The sleeve 80 has a long lead helical spline 82 which receives the flattened end 83 of the head 84 of a pin 85 which is driven into the shaft 23. The shaft 30 has a clearance notch 86 permitting the shaft 30 to be rotated relative to the shaft 23 as the sleeve 80 is moved longitudinally along the sleeve 30. The hole 87 in the shaft 30 is provided for the purpose of permitting the use of a tool for knocking out a pin 85. The sleeve 80 is provided with a notch 88 whose side walls 89 and 90 are oblique to the axis of the sleeve 80. For a purpose to be described, the side wall 90 is engageable with the tapered conical end 38b of the spring post 38.

The sleeve 80 is moved along the shaft 30 by a bell crank lever 91 pivotally supported by a shaft 92 supported by ears 93 extending from a bracket 94 attached by screws 95 to the housing 20 and providing a cover for an opening 96 therein. The bell crank lever 91 has a yoke 91a integral with arms 91b each carrying a stud 97 received by the groove 98 in the sleeve 80. The lever 91 has other arms 91c attached to a cross rod 99 which passes through a hole in the head of a stud 100 having a shank 101 which serves as a rivet riveting together washers 102 and 103 between which are located two impregnated cloth layers 104 which form a diaphragm. The periphery of the diaphragm 104 is clamped between flanges 105 and 106 of diaphragm case members 107 and 108 respectively; the flange 106 being spun over the flange 105 as indicated at 106a. The case 107 is provided with a vent 107a and is riveted to the bracket 94. The case 107 is provided with an internal annular flange 109 providing a guide for the stud 100 and providing a stop for an adjustable nut 110 threadedly attached to the stud 100 and secured in the desired position of adjustment by a lock nut 111. Normally, the sleeve 80 is maintained in a downward position shown in Fig. 2 and the diaphragm bulges toward the left or nearest to the case 107. This result is accomplished by a spring 112 bearing at one end against a shoulder 113 provided by a coupling 114 and at the other end against a shoulder 115 of a tubular spring guide 116 urged against the washer 103 by the spring 112. The coupling 114 is threaded into a collar 117 secured at 118 to the case 108. The coupling 114 provides a threaded extension 119 by which the suction chamber between the casing 108 and the diaphragm 104 may be connected with the fuel intake pipe of the engine.

As the suction in the engine intake increases, the pressure differential between the left hand and right hand sides of the diaphragm 104 will cause the diaphragm to move from the position shown in Fig. 2 to that shown in Fig. 4 against the action of the spring 112 thereby causing the lever bell crank lever 91 to move clockwise from the position shown in Fig. 2 to that shown in Fig. 5 thereby causing the sleeve 80 to move upwardly from the position shown in Fig. 2 toward that shown in Fig. 5. Due to the pin and spiral slot connection between the shaft 23 and the sleeve 80 the sleeve 80 is caused to rotate clockwise as viewed in Figs. 3 and 4 from the position shown in Fig. 3 to that shown in Fig. 4. As the sleeve 80 rotates in this manner, it carries with it the intermediate shaft 30 and in this way causes the shaft 30 and hence the cam 52 to be rotated clockwise relative to the shaft 23 in order to advance the timing of the ignition. As the suction of the fuel intake decreases, the pressure differential between the right and left hand sides of the diaphragm 104 will decrease permitting the spring 112 to move the diaphragm toward the left or toward the position shown in Fig. 2 thereby causing the sleeve 80 to move downwardly and hence the cam 52 to be adjusted in a counterclockwise direction relative to the shaft 23.

It will be noted that as the sleeve 80 moves upwardly, its oblique notch 88 will receive the tapered end 38b of the spring pin or post 38. Therefore, when the spring post extension 38b engages the oblique surface 90 defining one side of the notch 88, further movement of either automatic device for advancing the ignition cannot take place unless one of the devices operates in a manner tending to retard the ignition. In other words, if the ignition timing is fully advanced due to the operation of the suction device alone, bringing the sleeve 80 into the uppermost position shown in Fig. 5, no advancing of the ignition due to increase in speed can take place beyond that which causes movement of the pin 38b into engagement with the notch surface 90. Similarly, if the weights 33 have moved into the position of greatest advance to which they are capable of moving within the limits prescribed by the hole 38a surrounding the spring post 38, the ignition timing can be advanced by suction only to the extent permitted by the vertical distance between the inclined slot surface 90 and the spring post extension 38b.

As stated before, by limiting the total advance obtained by the combined effects of increasing engine speed and increasing fuel intake suction, the rate of advance with increasing speed or suction can be made relatively great. This is an advantage in certain types of engines which permit rapidly advancing timing of the ignition with increase in speed or intake suction. It is generally true that the spark advance may be advanced with increasing speed at a greater rate under part load conditions than under full load conditions. Under an operating condition of part throttle for example between 20 and 40 miles per hour, the advance may take place more rapidly than when increasing the speed under full load operating conditions. Hence the spark is advanced in response to both suction and engine speed increases. If the speed controller were designed to take care of the rapidly increasing rate of advance for part load conditions, the rate of centrifugal advance for full load conditions might be too great, so that by the time the engine had gotten up the full speed, the advance would be too great for proper operation of the engine. By interlocking the suction control mechanism with the centrifugal control mechanism the total amount of advance which can be possibly effected by automatic control is limited to the proper amount.

While the form of embodiment of the present invention as herein disclosed, constitutes a preferred form, it is to be understood that other forms might be adopted, all coming within the scope of the claims which follow.

What is claimed is as follows:

1. An ignition timer for internal combustion engines comprising in combination, a circuit interrupter, an engine driven cam for operating the same, devices responsive respectively to engine load conditions and engine speed conditions for controlling the timing of the operation of the circuit interrupter with respect to the cycle of engine operations, and means carried by one of said devices cooperating with the other of said devices for limiting the total amount of ignition interrupter advance produced by the combined effect of the devices.

2. An ignition timer for internal combustion engines comprising in combination, a circuit interrupter, an engine driven cam for operating the same, devices responsive respectively to engine intake suction and engine speed conditions for controlling the timing of the operation of the circuit interrupter with respect to the cycle of engine operations, and means carried by one of said devices cooperating with the other of said devices for limiting the total amount of ignition interrupter advance produced by the combined effect of the devices.

3. An ignition timer for internal combustion engines comprising in combination, a circuit interrupter, an engine driven cam for operating the same, a timer drive shaft, devices responsive respectively to engine intake suction conditions and engine speed conditions for operatively connecting the timer drive shaft with the timer cam and for varying the angular relation between them, and means for interlocking said devices in order to limit the total amount of ignition interrupter advance produced by the combined effect of the devices.

4. An ignition timer for internal combustion engines comprising in combination, a circuit interrupter, a cam for operating the same, a timer drive shaft, an intermediate shaft for connecting the timer drive shaft with the timer cam, a device responsive to engine intake suction for connecting the timer drive shaft with the intermediate shaft and for varying the angular relation between them, a device responsive to engine speed for connecting the intermediate shaft with the timer cam and for varying the angular relation between them, and means for interlocking said devices in order to limit the total amount of ignition interrupter advance produced by the combined effect of the devices.

5. An ignition timer for internal combustion engines comprising in combination, a circuit interrupter, a cam for operating the same, a timer drive shaft, automatic means for connecting the shaft and cam and for varying the angular relation between them in response to variations in engine operating conditions, an ignition timer housing for enclosing the interrupter and automatic means, said housing providing a bearing for the cam adjacent the circuit interrupter, and said housing providing a tubular shank enclosing the drive shaft and provided at its lower end with a relatively short bearing for the drive shaft, said shaft being free of support laterally by other portions of the timer housing.

6. An ignition timer for internal combustion engines comprising in combination, a circuit interrupter, an engine driven cam for operating same, devices responsive respectively to engine intake suction and engine speed conditions for controlling the timing of the operation of the circuit interrupter with respect to the cycle of the engine operations, and a part carried by the speed responsive device cooperating with the suction responsive device for limiting the amount of ignition interrupter advance produced by the combined effect of the devices.

In testimony whereof we hereto affix our signatures.

FRANK H. PRESCOTT.
JAMES L. ARTHUR.